Feb. 8, 1949.　　G. B. MOULTON ET AL　　2,461,433
TELESCOPING TRACTOR BOOM

Filed Oct. 1, 1945　　3 Sheets-Sheet 1

INVENTOR.
GEORGE B. MOULTON
AUTHUR C. MOULTON
BY *Victor J. Evans & Co.*
ATTORNEYS

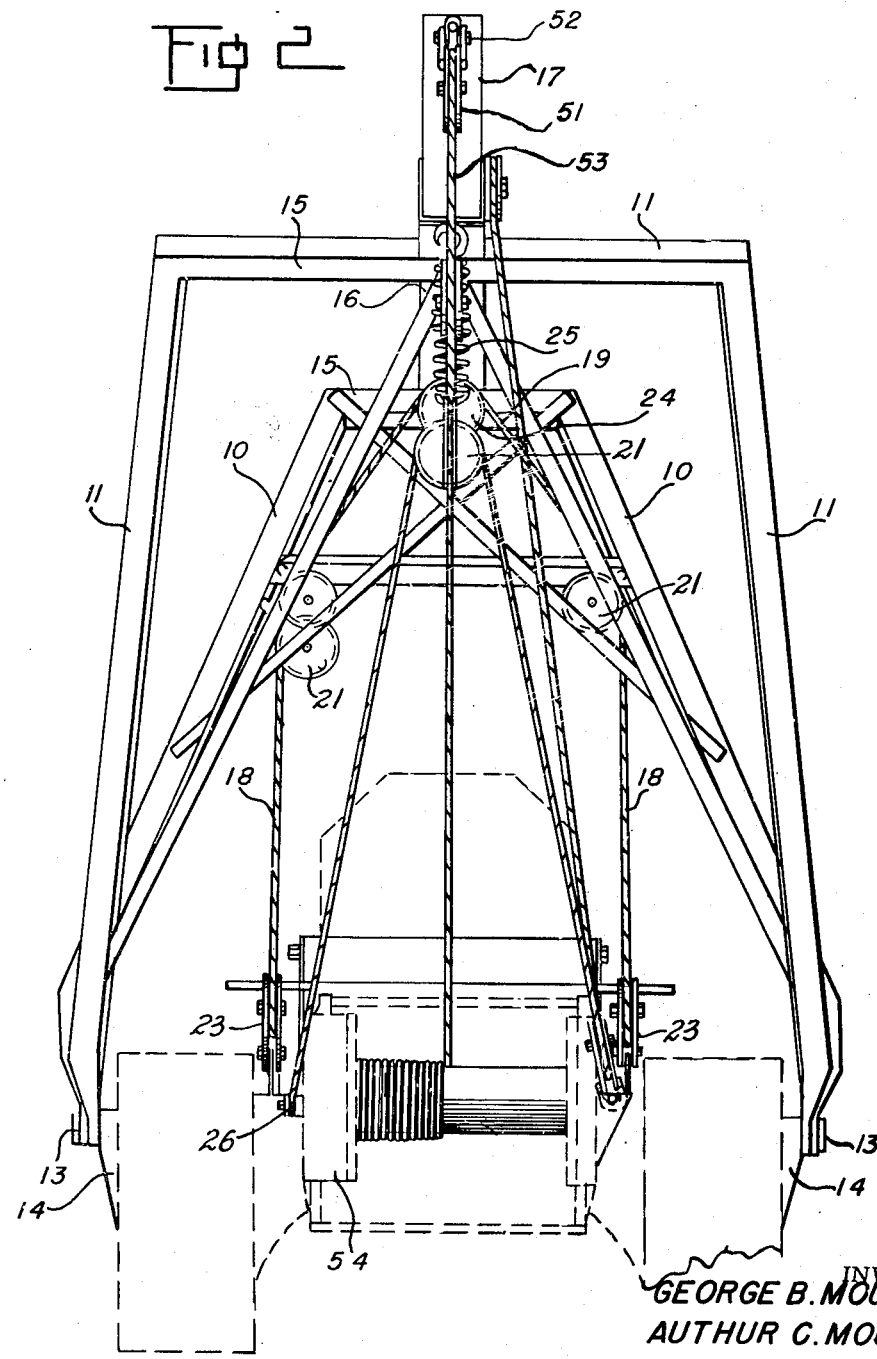

Feb. 8, 1949.
G. B. MOULTON ET AL
2,461,433
TELESCOPING TRACTOR BOOM
Filed Oct. 1, 1945
3 Sheets-Sheet 3
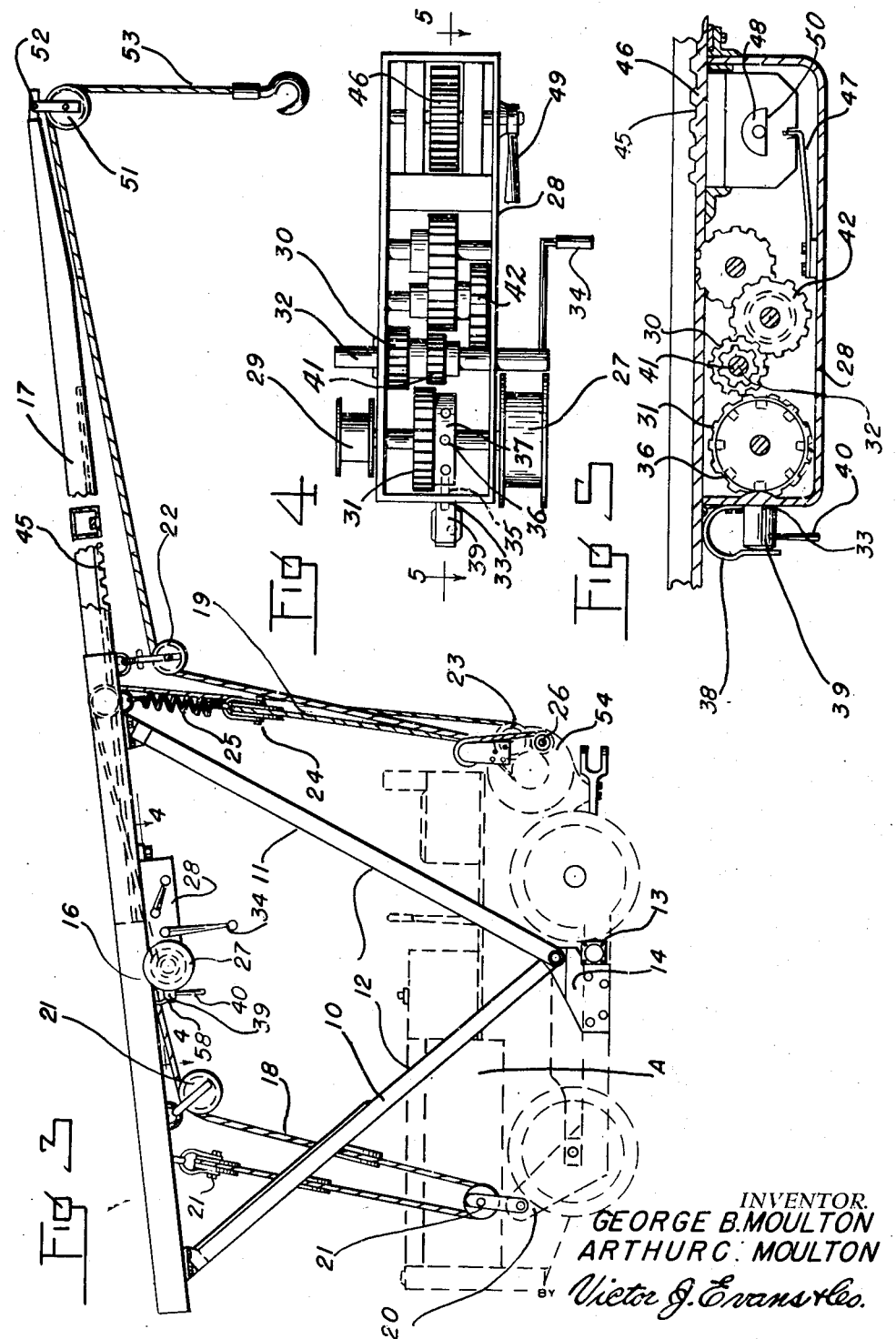
INVENTOR.
GEORGE B. MOULTON
ARTHUR C. MOULTON
BY Victor J. Evans & Co.
ATTORNEYS Patented Feb. 8, 1949

2,461,433

UNITED STATES PATENT OFFICE 2,461,433

TELESCOPING TRACTOR BOOM

George B. Moulton and Arthur C. Moulton, Newfield, Maine

Application October 1, 1945, Serial No. 619,594

3 Claims. (Cl. 212—8)

The invention relates to a boom and more especially to a telescopic tractor boom.

The primary object of the invention is the provision of a boom of this character, wherein a tractor can be built therewith, and such boom can be extended and contracted for loading and unloading purposes, the extending and contracting being effected automatically and is powered from the tractor motor unit.

Another object of the invention is the provision of a boom of this character, wherein it is one man controlled, and carried by a tractor so that it can be moved from one locality to another with dispatch and ease, the boom being equipped with a hoisting cable operated from a winch driven directly from the power unit of the tractor, the extending and contracting of the boom being manually controlled by the operator of the tractor.

A further object of the invention is the provision of a boom of this character, which is simple in construction, thoroughly reliable and efficient in operation, strong, durable, possessing a wide range of adjustment, readily and easily adjusted, its lifting cable being driven from the tractor power unit, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 2 is a view similar to Figure 1, looking toward the opposite end;

Figure 3 is a side view, partly broken away;

Figure 4 is a sectional view taken approximately on the line 4—4 of Figure 3;

Figure 5 is a sectional view taken approximately on the line 5—5 of Figure 4 looking in the direction of the arrows.

Similar reference characters indicate corresponding parts throughout the several views in the drawings.

Figure 1:
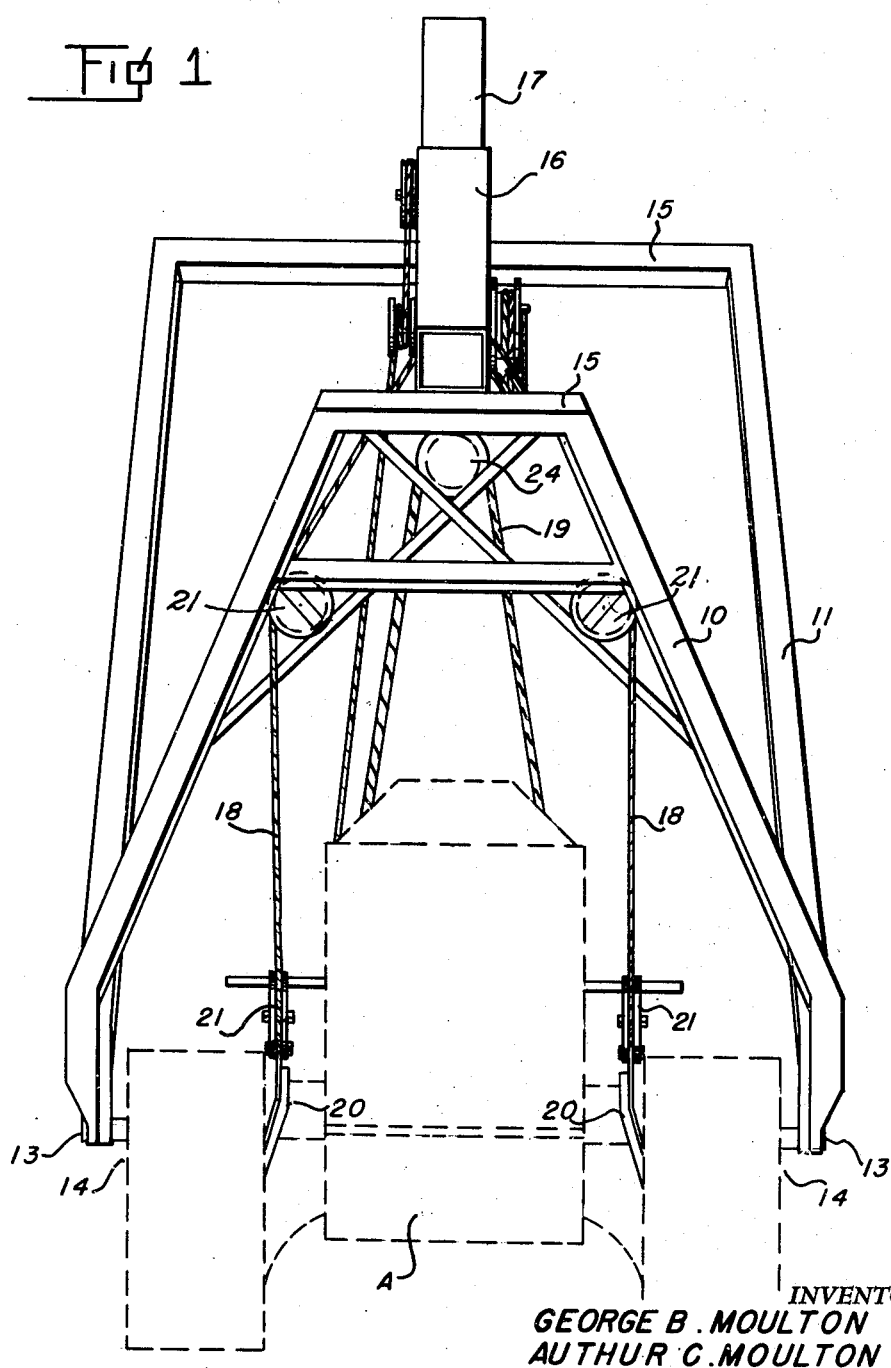
Figure 1 is an end elevation of the boom constructed in accordance with the invention, as carried by a tractor, the latter being schematically illustrated.

Referring to the drawings in detail, A designates generally through dotted line illustration a tractor, which is of any approved type, and now in general use, and upon this tractor is carried the boom constituting the present invention and hereinafter described in detail.

The boom comprises fore and aft upwardly divergent swinging truss frames 10 and 11, respectively, each being of substantially V-shaped or U-shaped, and the side members 12 of both frames are swingable on pivots 13, one on each side of the tractor A and these are in opposed alignment with each other, to project outwardly laterally from such tractor, and carried by supporting brackets 14 fixed in any suitable manner to the said tractor, approximately midway of the length thereof.

On the cross heads 15 at their centers is located a telescopic boom, which involves a fixed tubiform section 16, secured in any suitable manner to both frames 10 and 11, for carriage thereby, and an extensible section 17, telescopically interfitting the section 16, and of tubiform. This boom extends rearwardly of the tractor A, in operative position, and is raised and lowered through a vertically swinging arcuate path of travel.

A stay cable 18 holds the fore frame 10 forward, and a stay cable 19 holds the aft frame 11 back, the height of the boom being adjusted by changing the length of the stay cables. The stay cable 18 is connected directly to the tractor A, as at 20, through bracket arrangement, in order to utilize the entire weight of the tractor in holding the boom. The stay cable 19 can be connected to any suitable place on the rear of the tractor A, preferably as far in the rear as possible.

By passing the stay cables 18 through a series of blocks 21, two being connected to the tractor A and the others mounted on the boom frame, the tracks of the said tractor can oscillate to any desired position without altering or changing the boom. The stay cable 19 passes over a sheave 22 on the boom slide, around the block 23 attached to the back of the tractor A, up around the block 24 connected to the tensioning spring 25 and anchored on the back of the said tractor A at 26. The tensioning spring 25 keeps the stay cables tight at all times and compensates for differences between the stay cables due to flexing of the equalizer spring of the tractor.

The forward stay cable 18 is attached to a drum 27 on a gear box 28 and the rear stay cable 19 is attached to a drum 29 located on the opposite side of the gear box 28. These two drums are made the proper size to give approximately the same amount of movement of the boom frame for one revolution of the said drums. This keeps the stay cables nearly tight for any position of the boom, the remainder being taken up by the tension spring.

The drums 27 and 29 are operated by engaging gears 30 and 31, respectively, within the gear box 28 by sliding the crank shaft 32 out half-way. Then by disengaging a lock 33 and turning the crank 34 to the right or left, the boom can be adjusted either up or down, as may be required. The lock 33 consists of a lock pin 35 extending through the end of the gear box 28, engaging into holes 36 in the hub 37 of the gear 31. This lock pin 35 is held in position by a spring 38 and is disengaged by the use of a cam 39. By turning the lock handle 40 one quarter of a turn the cam 39 withdraws the lock pin and holds it in proper position.

The extensible section 17 of the boom is moved by engaging gears 41 and 42, respectively, by sliding the crank shaft 32 way out. This connects the crank 34 of the shaft 32 to the rack 45 on the section 17, so that by turning the crank, the section 17 can be moved either in or out of the section 16, as should be apparent.

The sliding section 17 is held in position by a lock, consisting of a short section of a rack 46, the teeth of which engage the teeth of the rack 45 on the said section 17. This lock is held in position by a spring 47. To disengage the lock a cam 48 is turned one quarter turn with the handle 49. A small flat area 50 on the cam holds it in the unlocked position.

The boom is of box-like construction with the rack 45 attached to the bottom side, preferably by welding. At the outer end of the boom, a rope block 51 with a side opening, is attached by a swivel 52 to carry the loading rope 53 in any direction, and this rope 53 is associated with a hoisting winch 54 in any suitable manner, which winch is upon the rear of the tractor A. The telescoping tractor boom can be operated in any desirable position, lifting any load that will not tip the tractor. Then the tractor can be operated as any type thereof with the boom in closed position.

What is claimed is:

1. A boom of the character described for carriage upon a tractor, comprising fore and aft truss frames swingingly rising from said tractor, telescopically interfitted sections forming an extensible boom and having one section thereof fixed to the frames, a loading rope movably carried by such sections, means for moving one of the sections with respect to the other of said boom, said last mentioned means comprising a rack formed on the lower surface of the last mentioned section, and a gear mounted in a gear box coacting with said rack, said gear box being mounted on the section fixed to said frames, and means for swinging the frames to selected positions on the tractor.

2. A boom of the character described for carriage upon a tractor, comprising fore and aft truss frames swingingly rising from said tractor, telescopically interfitted sections forming an extensible boom and having one section thereof fixed to the frames, a loading rope movably carried by such sections, means for moving one of the sections with respect to the other of said boom, said last mentioned means comprising a rack formed on the lower surface of the last mentioned section, and a gear mounted in a gear box coacting with said rack, said gear box being mounted on the section fixed to said frames, means for swinging the frames to selected positions on the tractor and means for holding the frames in adjusted position on the tractor.

3. A boom of the character described for carriage upon a tractor, comprising fore and aft truss frames swingingly rising from said tractor, telescopically interfitted sections forming an extensible boom and having one section thereof fixed to the frames, a loading rope movably carried by such sections, means for moving one of the sections with respect to the other of said boom, said last mentioned means comprising a rack formed on the lower surface of the last mentioned section, and a gear mounted in a gear box coacting with said rack, said gear box being mounted on the section fixed to said frames, means for swinging the frames to selected positions on the tractor, means for holding the frames in adjusted position on the tractor and means for locking the sections in adjusted relation to each other.

GEORGE B. MOULTON.
ARTHUR C. MOULTON.

REFERENCES CITED

The following references are of record in the file of this patent:

UNITED STATES PATENTS

| Number | Name | Date |
| --- | --- | --- |
| 965,493 | Williams | July 26, 1910 |
| 1,438,292 | Bevan | Dec. 12, 1922 |
| 1,673,307 | Best | Jan. 12, 1928 |
| 1,871,603 | Ginter | Aug. 16, 1932 |
| 2,235,913 | Beane | Mar. 25, 1941 |
| 2,283,443 | Klein | May 19, 1942 |
| 2,365,167 | Billings | Dec. 19, 1944 |
| 2,417,031 | Witherell | Mar. 4, 1947 |